United States Patent [19]

Padula, II et al.

[11] 4,190,331
[45] Feb. 26, 1980

[54] OPHTHALMIC MEASURING INSTRUMENT WITH ANGLE MEASURING MEANS

[76] Inventors: William V. Padula, II, 10 Manor Dr., Milford, Conn. 06460; William V. Padula, I, 299 Manor Ave., Cranford, N.J. 07016

[21] Appl. No.: 809,536
[22] Filed: Jun. 24, 1977
[51] Int. Cl.$^2$ .............................................. A61B 3/10
[52] U.S. Cl. .......................................... 351/5; 33/200
[58] Field of Search ................... 351/5, 9, 26; 33/200; 356/127

[56] References Cited
PUBLICATIONS

The Optometric Weekly, Sep. 28, 1961, pp. 1908–1910, Author: Otto Engelmann.

*Primary Examiner*—F. L. Evans
*Assistant Examiner*—Rodney B. Bovernick
*Attorney, Agent, or Firm*—Daniel H. Bobis

[57] ABSTRACT

An ophthalmic measuring instrument has an instrument frame with suitable clips for mounting the instrument frame to an eyeglass frame on the patient so that spaced eye viewing openings on the instrument frame of the ophthalmic measuring instrument are disposed in alignment with the position of the lenses for the given eyeglass frame to which the instrument frame is attached. The patient can view at a convenient reading distance any of a plurality of colored cards having white square targets of varying sizes thereon as a function of the working distance through adjustably connected transparent yellow and blue strips mounted on the instrument frame and movable relative to each other in front of said spaced eye viewing openings. By centering the instrument frame on the eyeglass frame, and monocularly occluding the patient's respective left eye and right eye, movement of first the yellow strip and then the blue strip, bisecting the patient's visual axes respectively for the left eye and the right eye will enable various measurements to be obtained, such as the exact inter-visual axes distance relative to the center of the eyeglass frames for near vision. The horizontally disposed blue strip can be provided with suitable bracket means for receiving a corrective lens where a patient has a refractive error or presbyopia.

Additionally, the instrument has an angle measuring device which includes, an elongated tube adjustably movable in a vertical arc and a horizontal arc to provide the inclination angle and vergence angle of the visual axis for each respective eye of the patient when the target is viewed.

2 Claims, 6 Drawing Figures

OPHTHALMIC MEASURING INSTRUMENT WITH ANGLE MEASURING MEANS

BACKGROUND OF THE INVENTION

This invention relates generally to devices for measuring eyes and more particularly to an ophthalmic measuring instrument which can be applied directly to an eyeglass frame selected by the patient so that a monocular measurement of the patient's visual axis can be obtained for each respective eye; and measurement of both the vertical inclination and convergence of the visual axes can be made; all of which measurements are critical in prescribing lenses, telescopes, and microscopes for patients with special optical needs.

When formulating the prescription for corrective lenses, the conventional technique for determining the geometric centers for such corrective lenses is to measure the interpupillary distance (PD) for the patient's eyes. This has been done by the examiner's objective use of a metric ruler or other device for measuring the distance between the inner edge of one pupil and the outer edge of the other pupil of the patient's eyes.

It has been found that scrupulously derived results from the conventional twenty-one point optometric examination can be voided by inaccurate PD measurements for the far point and near point working distances of the patient.

Because of the importance of these measurements to the examiner in determining the proper prescription for the patient's lenses particularly in low vision patients, various devices are known in the prior art for making accurate measurements of the PD distance for a patient's eyes such as is shown in U.S. Pat. Nos. 1,052,161, 2,197,139, and 2,491,312.

In U.S. Pat. No. 2,491,312 the problems which are met and the reasons for such measurements particularly in the filling and providing of bi-focal and multi-focal lenses is set forth in some detail.

While some prior art methods of measurement may be adequate to provide PD measurements for distance vision excepting eccentric fixation, the use thereof for providing the PD measurement for near vision results in errors which can cause induced prism and cylinder, in turn causing asthenopic and even aniseikonic symptoms. Prentice's rule known to those skilled in the art has shown that prism is a function of dioptric power times centemeters of displacement. Therefore, any error in these conventional methods of objective measurement of PD become critical when prescribing a high dioptric value prescription.

In this regard one critical source of error which the conventional methods of objective measurement of PD distance for a patient's eyes does not and cannot account for is the known fact that the visual axis for the eye passes 1 mm. nasal to the geometric axis for the given eye, that is the line passing through the anterior and posterior poles of the eye.

This nasal characteristic of the visual axis is not significant for distance vision because the visual axes are essentially parallel and therefore the conventional methods of objective measurement for the PD of the patient's eyes and the subjective or patient's measurements of the visual axes for the eyes will be essentially in agreement except for eccentric fixation.

When, however, these methods of measurements are applied to near vision, the inter-visual axes distance will be consistantly smaller because of the convergence of the visual axes at the vertex distance of the plane of the eyeglass frame.

Such inaccuracies of the conventional objective measurement techniques can be tolerated for most spherocylindrical refractive errors. This is not the case for spherical refractive errors above 4.00 diopters (D) and cylinder above 1.00 D and/or where a patient requires high refractive lenses, telescopes and/or microscopes. If these inaccuracies and errors are present they can cause many vision problems.

The monocular measurement of the patient's visual axis cannot be overlooked for the further reason that optical and facial assymetries can cause the geometric center of the lens for each eye to be displaced from the point at which the visual axes actually passes through the lens. Facial assymetry on each patient is such that the distance between each eye and the bridge of the nose is seldom equal.

In U.S. Pat. No. 2,884,832, a device and method is disclosed for measuring the inter-pupillary axes distance for a given patient's eyes by measuring the monocular pupillary axis distance for each of the respective eyes of the patient and the near convergence of the pupillary axes distance by measuring the inter-pupillary axes distance for the combined or binocular action of both eyes. However, the device utilized with this method of measuring can itself introduce error because it is difficult for the patient and the examiner to set and to maintain with the setting element thereof the vertical position of the visual axis for a given eye being measured, it does not allow vertical or horizontal measurement of the inclination of the visual axis which is important when prescribing spectacle-mounted telescopes and surgical binoculars, and the width of the target card used does not equal the visual angle subtended through the setting or viewing means of the device at the working distances.

The present invention seeks to meet and overcome these problems by providing a new and improved device which permits the examiner to define the visual axis for each of the patient's eyes. This device is affixed to the eyeglass frames selected by the patient so that the center of the eyeglass frame serves as a reference point. By placing the eyeglass frame with the improved device in accordance with the present invention thereon, in position to the patient's face, and having the patient view sized targets for the near working distance therethrough, the patient can subjectively provide the examiner with measurements of; the monocular visual axis (MVA) distance of the respective eyes of the patient relative the center of the eyeglass frame; measurements of the exact vertical displacement of the visual axis for the respective eyes of the patient; and also measurements of the inclination and vergence of the visual axis of each of the patient's eyes particularly for near vision so as to eliminate all possible sources of error and simplify and provide a standardized method for measuring the inter-visual axes for a patient's eyes from which an examiner can more accurately prescribe the required corrective lenses, telescopes and microscopes for patients with special optical needs.

SUMMARY OF THE INVENTION

Thus, the present invention covers an ophthalmic measuring instrument having an instrument frame with means for mounting the same on the eyeglass frame of the patient, said instrument frame having spaced eye viewing openings therein and adjustably mounted intersecting transparent colored strips movable for determining the visual axis for each of the patient's eyes with respect to a fixed and sized target, the instrument frame having index means thereon to provide substantially exact measurements for said monocular visual axis distance and the difference in the vertical positions of the visual axis for each respective eye of the patient.

Additionally, the ophthalmic measuring instrument as above described including, means thereon for measuring the inclination and convergence of the visual axes for the patient's eyes.

Accordingly, it is an object of the present invention to provide an improved ophthalmic measuring instrument to provide subjective measurements of the near point and far point monocular visual axis distance and vertical displacement between the visual axis for each eye.

It is another object of the present invention to provide an ophthalmic measuring instrument for measuring the vertical inclination of the visual axis as well as the inclination produced by vergence particularly in near vision measurements critical for prescribing corrective lenses, telescopes and/or microscopes for patients with special optical needs.

Other objects and advantages of the invention will be more fully brought out in the following description and accompanying drawings wherein.

Figures 1, 2:
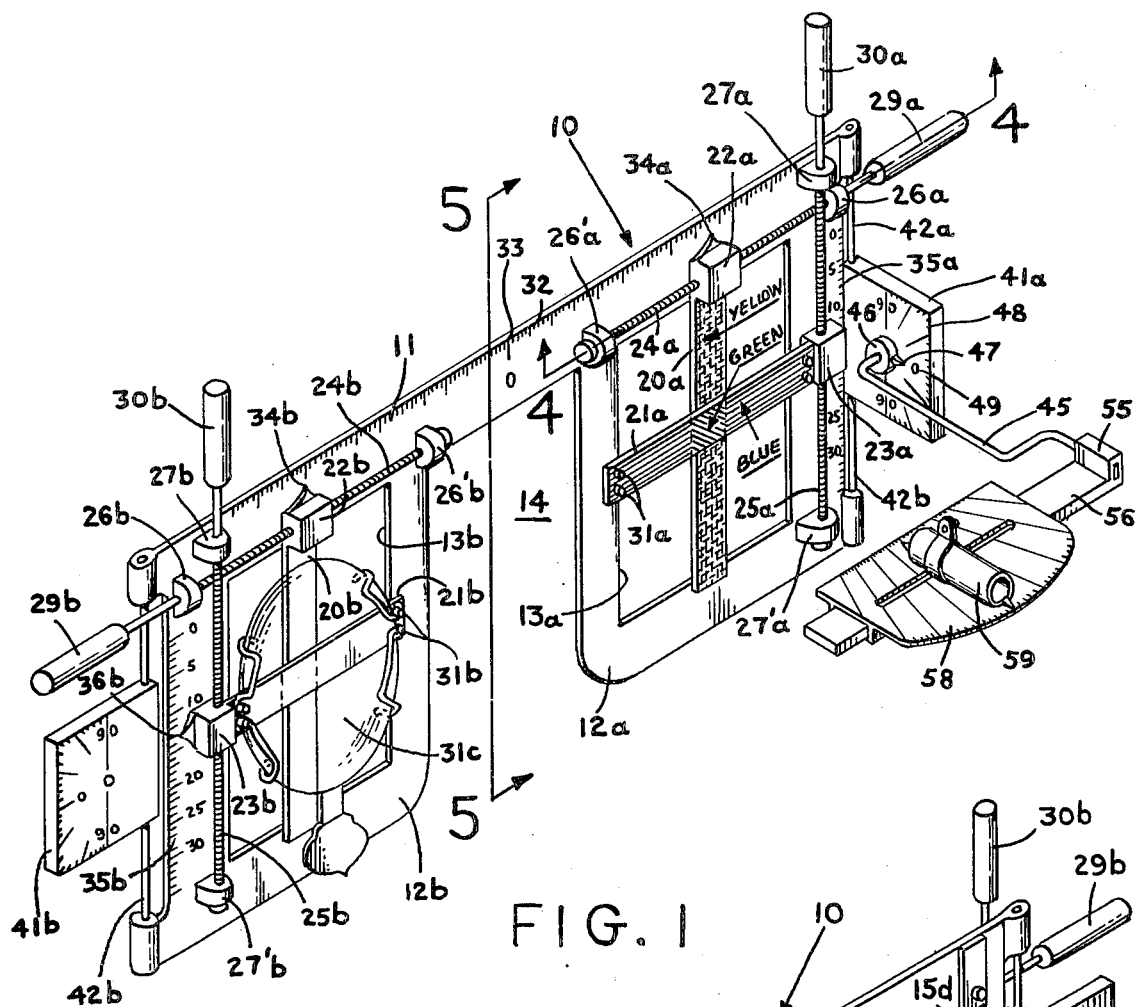
FIG. 1 is an isometric view of an opthalmic measuring instrument in accordance with the present invention.
FIG. 2 is a rear isometric view of the ophthalmic measuring instrument shown in FIG. 1 illustrating the manner of applying the instrument to a selected eyeglass frame.

Referring to the drawings FIGS. 1 and 2 show a preferred form of ophthalmic measuring instrument in accordance with the present invention which has a main instrument frame generally designated 10 made of any suitable material such as aluminum, stainless steel or plastic.

The instrument frame 10 is a relatively thin flat elongated generally rectangular member having an elongated transverse member 11 and spaced side sections 12a and 12b which depend from and are in the same plane as the transverse member 11. The spaced side sections 12a and 12b are approximately the same thickness as the transverse member 11 and include spaced eye viewing openings as at 13a and 13b respectively therein and define a space as at 14 therebetween. Frame 10 is provided with clips 15a, 15b, 15c and 15d on the back thereof to permit the instrument frame to be mounted to an eyeglass frame generally designated 16 shown in phantomized form by the dotted lines in FIG. 2 so that the eye viewing openings 13a and 13b are disposed in alignment with the corresponding lens areas 17a and 17b on the eyeglass frame 16.

The ophthalmic measuring instrument has two types of measuring devices mounted on the instrument frame 10. The first is for measuring the monocular visual axis distance for each of the patient's eyes generally referred to herein as the MVA, and the second is for measuring the inclination and convergence of the visual axis for each of the respective eyes as will now be described.

MVA MEASURING ASSEMBLY

To accurately measure the MVA distance of the patient's eyes in accordance with the present invention, two intersecting transparent strips or elongated members are adjustably mounted as at 20a and 21a on the side section 12a and 20b and 21b on the side section 12b. Colored strips 20a and 20b are disposed vertically and in front of the eye viewing openings 13a and 13b and can be indexed to move right and left in the vertical plane in which they lie relative to the eye viewing openings 13a and 13b. Colored strips 21a and 21b also are disposed in front of eye viewing windows 13a and 13b, and horizontally oriented in an overlapping and intersecting relation with the colored strips 20a and 20b respectively. The colored strips 21a and 21b can be indexed to move up and down in the vertical plane in which they lie relative to the eye viewing openings 13a and 13b and to the colored strips 20a and 20b, as is shown in FIGS. 1 and 2 of the drawings.

The respective strips 20a and 20b are preferably colored yellow and the strips 21a and 21b will be colored blue. This difference in color for the respective vertical and horizontal strips is selected because they are complimentary colors and as is more fully described below will permit the patient to report a color change of a viewed target. For example, a color change from yellow to green when the strips are brought into intersecting relationship in the visual axis of the respective left or right eye of the patient being measured.

It will be understood by those skilled in the art that any combination of complimentary colors or other color change arrangement can be used for the respective horizontal and vertically adjustable strips without departing from the scope of the present invention.

In order to adjustably index or position the vertical strips 20a and 20b and the horizontal strips 21a and 21b relative to each other and relative to the respective eye viewing openings 13a and 13b, these strips are connected as by hubs 22a and 22b on the vertical strips 20a and 20b and hubs 23a and 23b on the horizontal strips 21a and 21b respectively to threaded members 24a, 24b, 25a, and 25b. The threaded members in turn are journalled in their respective spaced journal bearings on the main frame 10 as at 26a and 26'a for threaded member 24a; 26b and 26'b for threaded member 24b; 27a and 27'a for threaded members 25a, and 27b and 27'b for threaded member 25b as is shown in FIGS. 1 to 5 of the drawings.

FIGS. 1 to 5 of the drawings further show that each of the threaded members 24a, 24b, 25a and 25b are provided with handles respectively at 29a for threaded member 24a, 29b for threaded member 24b, 30a for threaded member 25a, and 30b for threaded member 25b. When these threaded members are turned clockwise the vertical and horizontal strips move in one direction and when the handles are turned counterclockwise, the vertical and horizontal strips move respectively in the other direction.

As is clear from FIGS. 1, 3, 4 and 5 the respective horizontal strips 21a and 21b lie in a plane which is in front of the respective vertical strips 20a and 20b and the vertical strips in turn lie in and move in a vertical plane which is in front of the eye viewing openings 13a and 13b. Therefore the respective vertical and horizontal strips can be moved in intersecting relationship relative to each other and at the same time can be moved relative to the eye viewing openings 13a and 13b.

Further the position of the horizontally disposed strips 20a and 20b allows for spring clips as at 31a and 31'a and 31b and 31'b to be provided thereon for snapping or mounting a corrective lens as shown at 31c on the clips 31b and 31'b of horizontally disposed strip 21b in FIG. 1 of the drawings.

Index markings or graduations 32 are provided on the transverse member 11 and are disposed to extend thereon from the center zero point 33 in opposite directions on either side thereof in the conventional centimeter and millimeter graduations.

The zero centerpoint is necessary to enable the instrument frame to be placed in alignment with the center point of the eyeglass frame selected by the patient on which the ophthalmic measuring instrument 10 will be mounted in order to make the subjective measurement and thus to position the vertically disposed members 20a and 20b in the visual axis of the respective right eye and left eye of the patient. In order to facilitate an accurate reading of this distance the pointers as at 34a and 34b will be provided on each of the respective vertically disposed transparent strips 20a and 20b.

Similarly each of the respective side sections 12a and 12b are provided with graduated markings as at 35a and 35b, the zero point therefor being shown at 36a and 36b. The graduated markings are operatively associated with the pointers 37a as at FIG. 5 and 37b on the respective hubs 23a and 23b of the horizontally disposed transverse members 21a and 21b.

Figure 3:
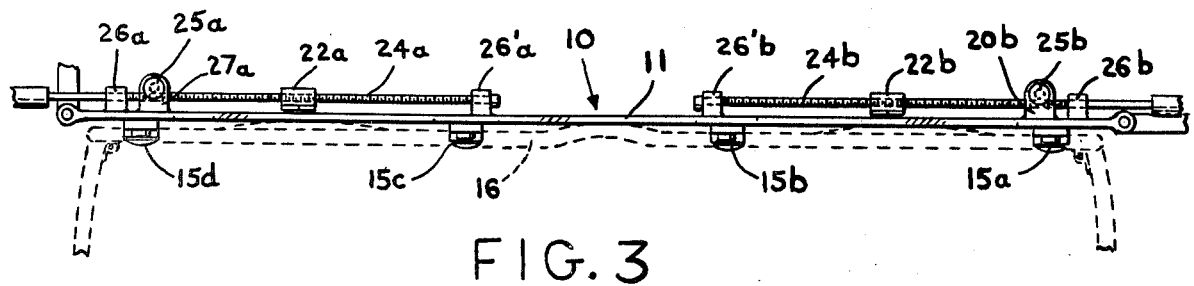
FIG. 3 is a top plan view of an ophthalmic measuring instrument as applied to the selected eyeglass frame as shown in FIG. 2.
Figure 4:
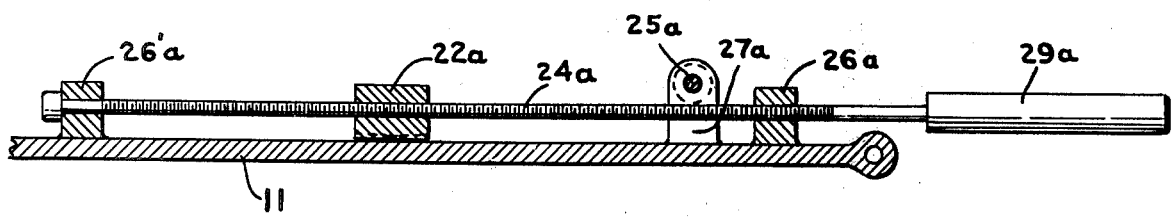
FIG. 4 is a horizontal section taken on line 4—4 of FIG. 1.

In utilizing the ophthalmic measuring instrument to measure the exact position of the patient's visual axes, the center of the brige on the eyeglass frame selected by the patient is marked by halfing the measured distance across the eyeglass wire of the eyeglass frame. The zero centerpoint 33 on the instrument frame 10 is aligned with this marked point and the instrument frame 10 is clipped to the patient's eyeglass frames 16 as is shown in FIGS. 2 and 3 of the drawings and the assembled eyeglass frame and ophthalmic measuring instrument are squared with each other and placed squarely in position on the bridge of the patient's nose. The patient is then given a colored card with a specifically sized white square target thereon and is requested to hold the same at a measured working distance.

The opthalmic measuring instrument in accordance with the present invention will be used with colored cards having different sized white target squares thereon. The size of the squares on the card will vary according to the working distance and the visual angle subtended through the sized horizontal and vertical strips. The reason for such sized targets is a function of the focal distances used with respect to the anticipated plane of the lenses, as will be understood by those skilled in the art.

Now the examiner adjusts the vertically disposed strips 20a and 20b until the patient advises that the white target color has changed to yellow. Then, the Examiner adjusts the horizontally disposed strips 21a and 21b until the patient advises that the color of the target has changed to green.

The MVA distance for the respective left eye and right eye are now read from the zero centerpoint 33 on the upper index markings or graduations 32. The vertical position for the respective eyes can be read on the side index markings or graduations as at 35a and 35b for the vertical displacement of the respective right and left eyes of the patient will be the difference between these readings.

There is thus provided a device which standardizes and eliminates the potential for error by the subjective determination of the near point and far point MVA measurements and for the vertical displacement of a patient's eyes.

ANGLE MEASURING ATTACHMENT

Additionally, the ophthalmic measuring instrument in accordance with the present invention provides angle measuring attachment generally designated 40 for measuring the vertical inclination of the visual axis as well as the vergence angles of the respective eyes in near viewing, which measurements are also critical to the prescription of lenses, telescopes and/or microscopes for patients with special optical needs.

In order to supportably connect the inclination and vergence measuring attachment to the instrument frame 11, the frames are provided with support blocks as at 41a and 41b on the respective left side and right side of the instrument frame. The support blocks 41a and 41b are slidably and/or adjustably mounted on rods 42a and 42b which are connected to the respective left and right sides of the instrument frame by any suitable means. The support blocks 41a and 41b are not only slidably and adjustably mounted on the rods 42a and 42b but additionally may be angularly pivoted relative to the instrument frame so that they can be swung into and out of operating position as may be required in the use of the ophthalmic measuring instrument 10.

Only one angle measuring attachment 40 is shown in operative association with the support block 41a and in position for measuring the vertical inclination and vergence of the visual axis for the left eye of the patient.

It will be understood by those skilled in the art that the inclination and vergence measuring attachment can be removed from the support block 41a and readjusted and positioned for connection to the support block 41b for measuring the inclination and vergence of the visual axis of the right eye of the patient.

FIGS. 1, 2, 5 and 6 show that the inclination and vergence measuring attachment includes an elongated support arm 45 which is connected inwardly of one end thereof to an annular member 46 having a pointer 47 thereon.

The pointer 47 coacts with angular index markings or graduations as at 48 having a zero point 49 thereon so that the pointer can provide the angular inclination of the attachment 40 during the use thereof for measuring the vertical inclination of the visual axis of the given eye being measured.

Figure 6:
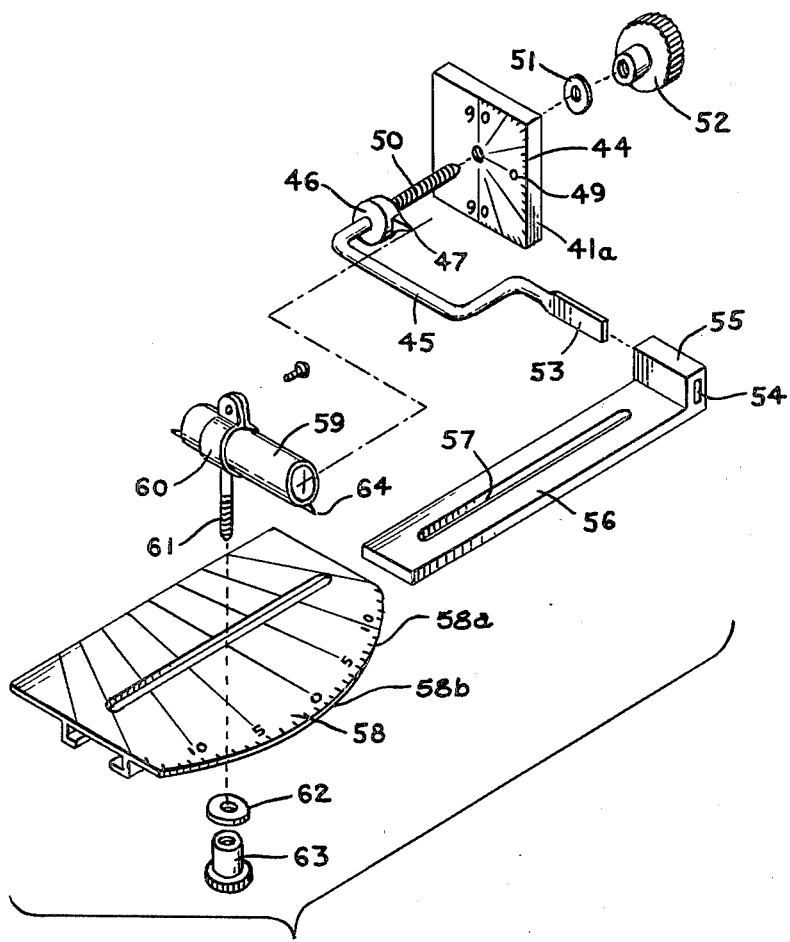
FIG. 6 is an exploded perspective view of the angle measuring attachment for the ophthalmic measuring instrument shown in FIG. 1.

The end of the elongated support arm 45 having the annular member 46 thereon is threaded as at 50 to coact with a washer 51 and knurled nut 52 to hold the attachment 40 in the vertically adjusted position on the side support member 41a as is shown in FIG. 6 of the drawings.

The opposite end of the elongated support arm 45 has a rectangular tennon shape as at 53 which can be fitted into a rectangular opening 54 on the boss 55 of a support platform 56 having an elongated longitudinally extending slot 57 therein.

Figure 5:
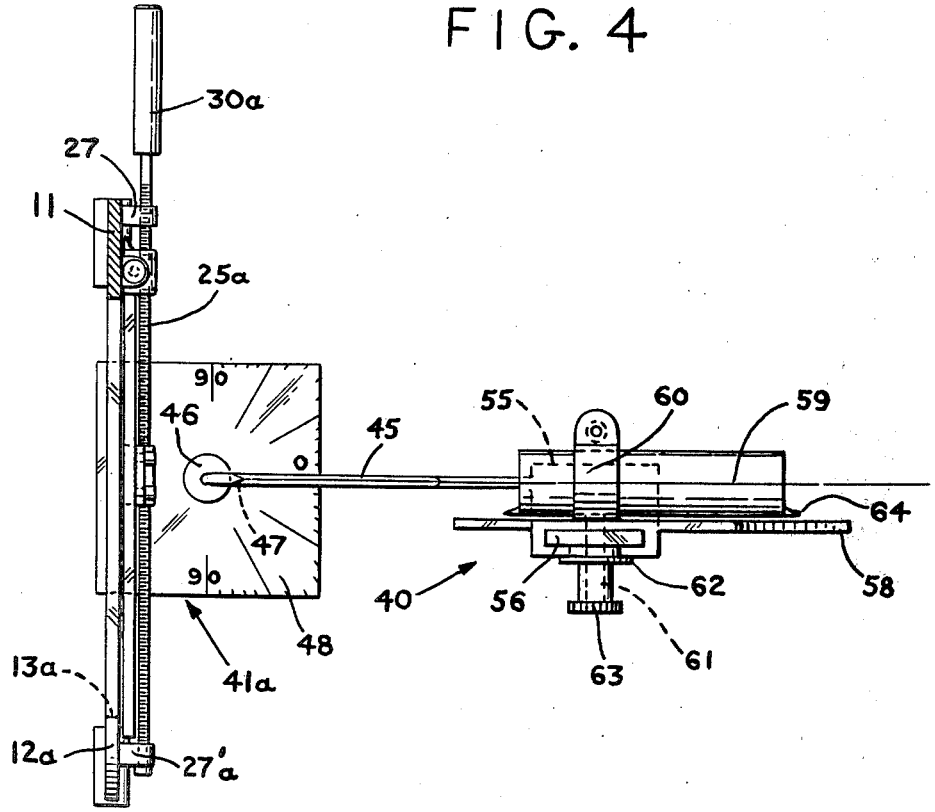
FIG. 5 is a vertical section taken on line 5—5 of FIG. 1.

The support platform 56 has a measuring table 58 slidably disposed thereon which coacts with a viewing tube 59 disposed continuous to the measuring table 58 in assembled position as shown in FIGS. 1, 2, and 5 of the drawings.

The viewing tube 59 and measuring table 58 are held in the slot 57 by a bracket 60 mounted about the viewing tube 59 and having a threaded member 61 which is sufficiently long to extend therethrough to coact with a washer 62 and knurled knob 63 for adjustably holding the measuring table 58 and viewing tube 59 can be moved by loosening the knurled knob 63 so as to position the measuring table 58 and the viewing tube 59 in position to read the desired measurements. The measuring table 58 will be provided with diverging index markings or graduations as at 58a which diverge from a point 14.7 m.m. behind the instrument frame as will be understood by those skilled in the art. The index markings 58a are provided with a zero point as at 58b.

The measuring table 58 will be adjusted perpendicular to the intersecting axis of the vertical strip 20a and the horizontal strip 21a.

In the use of the inclination and vergence measuring attachment 40, the measuring table 58 is first set with the measuring attachment disposed so that the pointer 47 is in the zero axis of the index markings or graduations 48 on the side support member 41a. After the measuring table 58 is set the attachment 40 is rotated vertically and the viewing tube 59 moved horizontally until the viewing tube lies in the visual axis of the respective eye of the patient being measured and the knurled knobs 52 and 63 are then tightened and the position of the pointers 47 and the pointers 64a and 64b read to provide the respective vertical inclination angle and vergence angles for the given eye being measured.

Thus, an improved attachment is provided for standardizing the procedure and eliminating error as much as possible in the subjective measurement of the vertical inclination and vergence of the visual axis for each given eye of a patient.

Thus, the improved ophthalmic measuring instrument in accordance with the present invention will provide an improved measuring device and method which has the following advantages.

1. It utilizes a subjective measurement of the visual axis rather than an objective measurement.
2. It standardizes the procedure and limits error as much as possible.
3. It allows a monocular measurement rather than a binocular measurement.
4. It takes both horizontal and vertical measurements to allow for facial and/or optical asymmetries.
5. It measures both the vertical inclination of the visual axis and also the horizontal inclination produced by vergence for each respective eye.

It will be understood that the invention is not to be limited to the specific construction or arrangement of parts shown but that they may be widely modified within the invention defined by the claims.

What is claimed is:

1. An ophthalmic measuring instrument to be detachably connected to the eyeglass frame of a patient in front of the lens area in said eyeglass frame comprising,
   a. an instrument frame having a front, a back, spaced eye viewing openings and a medially disposed nose opening,
   b. clip means on the back of said frame for detachably connecting the instrument frame to the eyeglass frame of the patient so that the eye viewing openings are disposed substantially in front of and in alignment with the lens area of said eyeglass frame,
   c. first and second vertically disposed transparent colored strips adjustably connected to the instrument frame to permit indexing of each of said strips in front of an associated one of said eye viewing openings,
   d. first and second horizontally disposed transparent colored strips adjustably connected to the instrument frame to permit indexing of each of said strips in front of an associated one of said eye viewing windows in intersecting relation with an associated one of said vertically disposed colored strips,
   e. the respective first and second horizontally disposed transparent colored strips having a color which causes a perceptive color change to the patient when the associated transparent colored strips bisect the visual axis of the patient's eye being measured,
   f. graduated upper markings on the front of said frame having a center point to enable the said frame to be aligned with the center of the eyeglass frame to which it is attached and operatively associated with the first and second vertically disposed transparent colored strips to enable an MVA distance measurement to be made whenever either of said vertically disposed transparent colored strips bisect the visual axis of a given eye of the patient,
   g. a first and second set of graduated markings on the front of said frame operatively associated with the first and second horizontally disposed transparent colored strips to permit the vertical displacement between the patient's respective eyes to be measured when the horizontally disposed transparent colored strips are in the visual axis of the patient, and
   h. angle measuring means detachably connectable to said instrument frame for measuring the vertical inclination and vergence of each respective eye of the patient.

2. In an ophthalmic measuring instrument as claimed in claim 1 wherein said angle measuring means detachably connectable to said instrument frame for measuring the vertical inclination and vergence of each respective eye of the patient includes,
   a. a support member slidably, and adjustably connected to said instrument frame and angularly adjustable relative thereto,
   b. an elongated support arm detachably connectable to said support member and vertically movable in an arc relative the support member,
   c. a support platform connected to said elongated support arm remote from the point of connection to said support member,
   d. a viewing tube adjustably connected to said support platform and horizontally movable into the visual axis of the patient's eye being measured, and
   e. graduation marks on the said angle measuring means to permit the vertical inclination and vergence angle thereof to be measured.

* * * * *